United States Patent [19]
Kung et al.

[11] Patent Number: 5,927,989
[45] Date of Patent: Jul. 27, 1999

[54] FOUR-PAN ALGEBRA BALANCE HAVING AN IMBALANCE CORRECTION MECHANISM

[75] Inventors: George Kung, Stevens Point; Ken Vicchiollo, Berlin, both of Wis.

[73] Assignee: Cuisenaire Company of America, Inc., White Plains, N.Y.

[21] Appl. No.: 08/909,346

[22] Filed: Aug. 11, 1997

[51] Int. Cl.[6] .............................. G09B 1/00; G01G 1/22
[52] U.S. Cl. .......................................... 434/194; 177/190
[58] Field of Search ................................... 434/188, 191, 434/194, 195, 203, 187, 204; 177/190–198, 262, 263

[56] References Cited

U.S. PATENT DOCUMENTS

| | | | |
|---|---|---|---|
| 784,145 | 3/1905 | Donecker . | |
| 3,000,114 | 9/1961 | Orlov | 35/30 |
| 3,721,019 | 3/1973 | Befferman | 35/1 |
| 3,742,619 | 7/1973 | Jenks | 35/30 |
| 4,713,009 | 12/1987 | Borenson | 434/188 |
| 5,425,643 | 6/1995 | Strickland | 434/194 |

Primary Examiner—Robert A. Hafer
Assistant Examiner—John Edmund Rovnak
Attorney, Agent, or Firm—Nutter, McClennen & Fish, LLP

[57] ABSTRACT

A four-pan algebra balance includes an imbalance correction mechanism for maintaining a balance beam in a horizontal equilibrium position unless the imbalance between the two sides of the device exceeds a predetermined amount. The balance includes a base, an upright stand mounted to, and extending substantially vertically from the base, a crossbar mounted to an upper end of the stand so as to extend substantially horizontally and the balance beam pivotally coupled to a midpoint of the stand. A first weight receptacle subassembly including two pans is coupled to a first end of the crossbar and a first end of the balance beam and a second weight receptacle subassembly including two pans is coupled to a second end of the crossbar and a second end of the balance beam. A visual indicator provides an indication of the relative equality of the first and second weight receptacle subassemblies. Various embodiments for the imbalance correction mechanism are disclosed, including an elastic strip, band, or spring coupled between the balance beam and the stand and a bolt coupled to the balance beam and adapted to receive a nut.

21 Claims, 10 Drawing Sheets

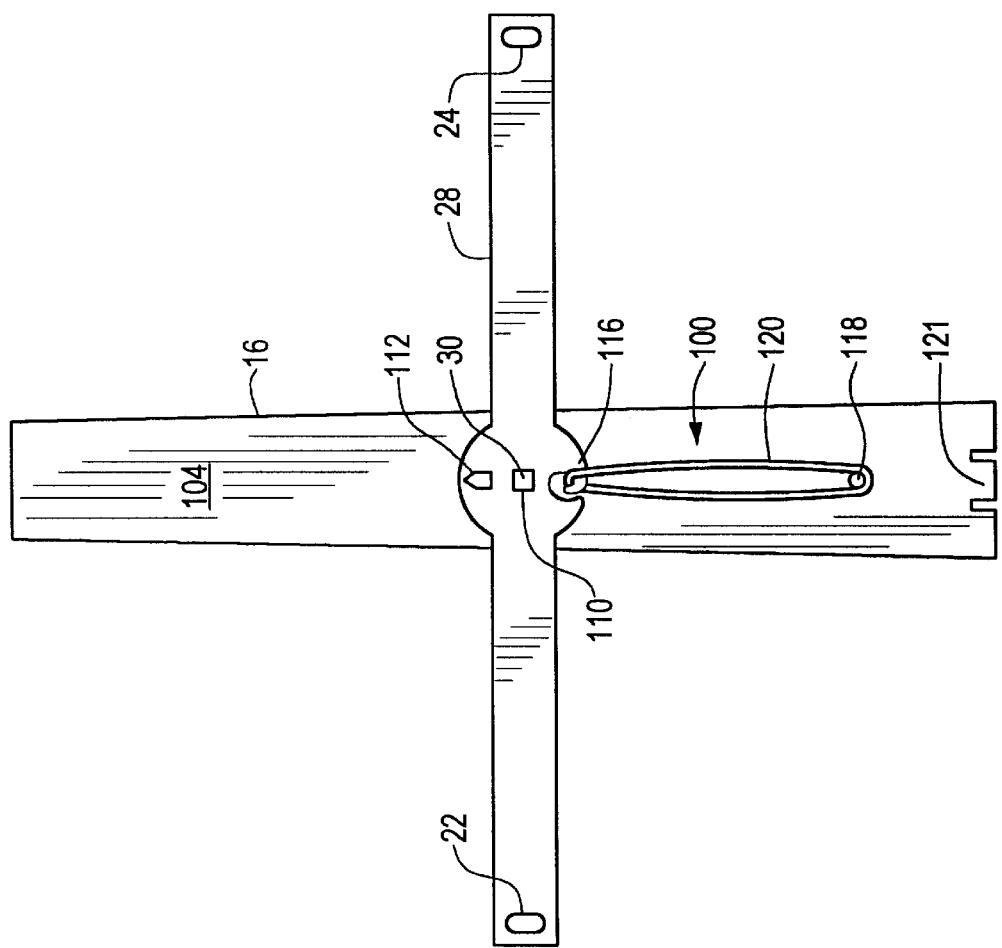
FIG. 5
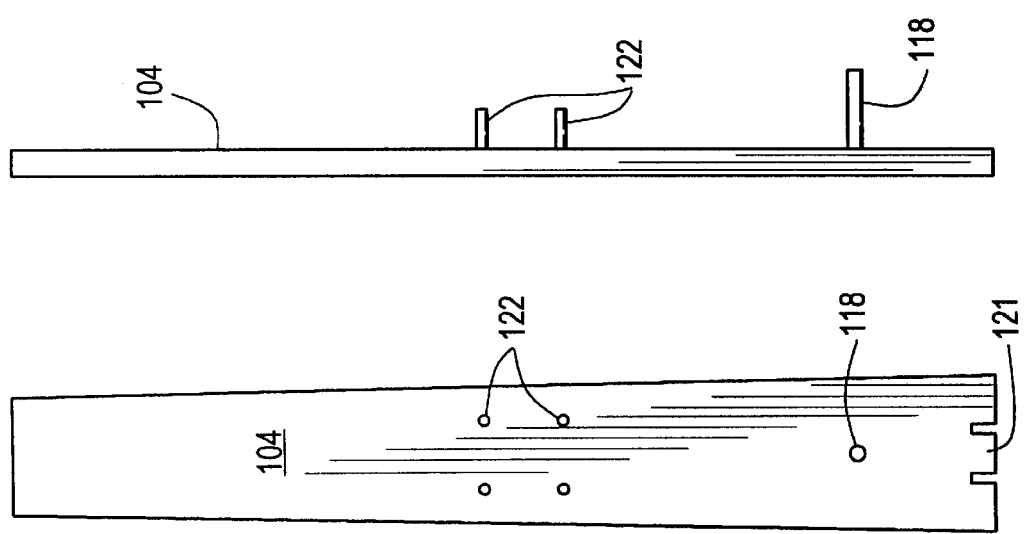
FIG. 4A
FIG. 4 x = 3

2x = 6

$-1 + 1 + 2x = 6 + x - x$ $-1 + 1 + x = 6 - x$ $-3 + 2x = 5$ $-3 + 3 + 2x = 8$ $2x = 8$ $x = 4$

FOUR-PAN ALGEBRA BALANCE HAVING AN IMBALANCE CORRECTION MECHANISM

CROSS-REFERENCE TO RELATED APPLICATIONS

Not applicable.

STATEMENTS REGARDING FEDERALLY SPONSORED RESEARCH

Not applicable.

BACKGROUND OF THE INVENTION

Educational devices in the form of balances for teaching algebraic principles are known. One such balance, described in U.S. Pat. No. 784,145 to Donecker, includes four receptacles, or pans, adapted for receiving weights, with two receptacles disposed on either side of the balance. The balance is intended for use with weights of known mass which represent integer values and weights of "unknown," but marked, mass which represent variables. In use, an imbalance between the two sides of the device causes a lever, or balance beam, to tilt from its horizontal equilibrium position, thereby indicating an algebraic inequality in the demonstrated expression. The '145 device advantageously permits various algebraic principles to be visually and interactively demonstrated, including the subtraction and multiplication of positive and negative quantities and the solving of equations.

A similar four-pan balance is described in U.S. Pat. No. 3,000,114 to Orlov. However, the '114 balance further includes a visual indicator with which the equality or inequality of the demonstrated expression is indicated. Thus, instead of determining the relative equality of the demonstrated expression by a visual assessment of whether or not the lever is horizontal as in the '145 balance, the '114 visual indicator provides an easy-to-read indication of such condition.

One limitation of conventional balances however, is their dependence on the precision of the mass of the weights. This is because any deviation from the expected mass of the weights can result in a false indication of inequality, even when the two sides of the modeled expression are algebraically balanced. While the tolerance of the weight mass can be tightened with the use of precise manufacturing techniques and/or strict quality control, these requirements generally increase the cost of the weights. Further, even with the most precise manufacturing techniques and strict quality control, some tolerance in the mass of the weights is generally unavoidable.

BRIEF SUMMARY OF THE INVENTION

The invention is directed to a four-pan algebra balance including an imbalance correction mechanism for providing a restorative force to maintain a balance bean of the device in its horizontal, equilibrium position unless the imbalance between the two sides of the device exceeds a predetermined amount. With this arrangement, usual variations in the mass of weights used with the balance are prevented from causing false indications of algebraic inequality, thereby enhancing the usefulness and effectiveness of the balance as a teaching aid.

The balance includes a base, an upright stand mounted to the base so as to extend substantially vertically, a crossbar mounted to an upper end of the stand so as to extend substantially horizontally, and a balance beam. The balance beam is pivotally coupled to a midpoint of the stand and has a horizontal position in equilibrium. A first weight receptacle subassembly including a first pair of pans is coupled to a first end of the crossbar and a first end of the balance beam. An identical, second weight receptacle subassembly including a second pair of pans is coupled to a second end of the crossbar and a second end of the balance beam. A visual indicator coupled to the balance beam provides an indication of the relative equality of the first and second weight receptacle subassemblies. Preferably, the indicator includes a pointer adapted for being in a first position when the first and second weight receptacle subassemblies are substantially balanced (i.e., when the values modeled by the two sides of the balance are algebraically equal) or a second position when the two weight receptacle subassemblies are imbalanced by more than the predetermined amount (i.e., when the values modeled by the two sides of the balance are algebraically unequal).

In one embodiment, the imbalance correction mechanism is coupled between the balance beam and the stand. The imbalance correction mechanism may be provided in the form of an elastic strip, an elastic band or a spring which, in assembly, is biased in tension so as to exert a restorative force on the balance beam to tend to maintain the beam in its horizontal equilibrium position. In an alternative embodiment, the imbalance correction mechanism is coupled to the balance beam and is provided in the form of a threaded bolt adapted to mate with a threaded nut. The restorative force presented by the bolt and nut combination is adjustable by adjusting the extent to which the nut is mated with the bolt.

Preferably, the restorative force introduced by the imbalance correction mechanism is assisted by the fulcrum of the balance beam (i.e., the location on the balance beam at which the beam is pivotally coupled to the stand) being disposed near the top edge of the beam. With this arrangement, the weight of the beam below the fulcrum acts in conjunction with the restorative force of the imbalance correction mechanism to maintain the balance beam in its horizontal equilibrium position.

Also described is a method of providing an algebra balance including the steps of providing a base, an upright stand mounted to the base and extending substantially vertically, and a crossbar mounted to an upper end of the stand so as to extend substantially horizontally. The method further includes attaching a balance beam to a midpoint of the stand about which the balance beam is pivotable with the balance beam having a horizontal position in equilibrium and attaching first and second weight receptacle subassemblies to first and second ends of the balance beam and crossbar, respectively. A further step includes providing an imbalance correction mechanism coupled to the balance beam to provide a restorative force to urge the balance beam to its horizontal equilibrium position unless the first and second weight receptacle subassemblies are imbalanced by more than a predetermined amount. Algebraic equality is visually indicated when the first and second weight receptacle subassemblies are substantially balanced and algebraic inequality is visually indicated when the first and second weight receptacle subassemblies are imbalanced by more than the predetermined amount.

BRIEF DESCRIPTION OF THE DRAWINGS

The foregoing features of this invention, as well as the invention itself, may be more fully understood from the following description of the drawings in which:

FIG. 4 shows the back plate of the stand of FIG. 1;

FIG. 4A is a side view of the back plate of FIG. 4;

FIG. 5 shows the relative placement of the back plate of the stand, the central balance beam and the imbalance correction mechanism of FIG. 1 in assembly;

DETAILED DESCRIPTION OF THE INVENTION

Figure 1:
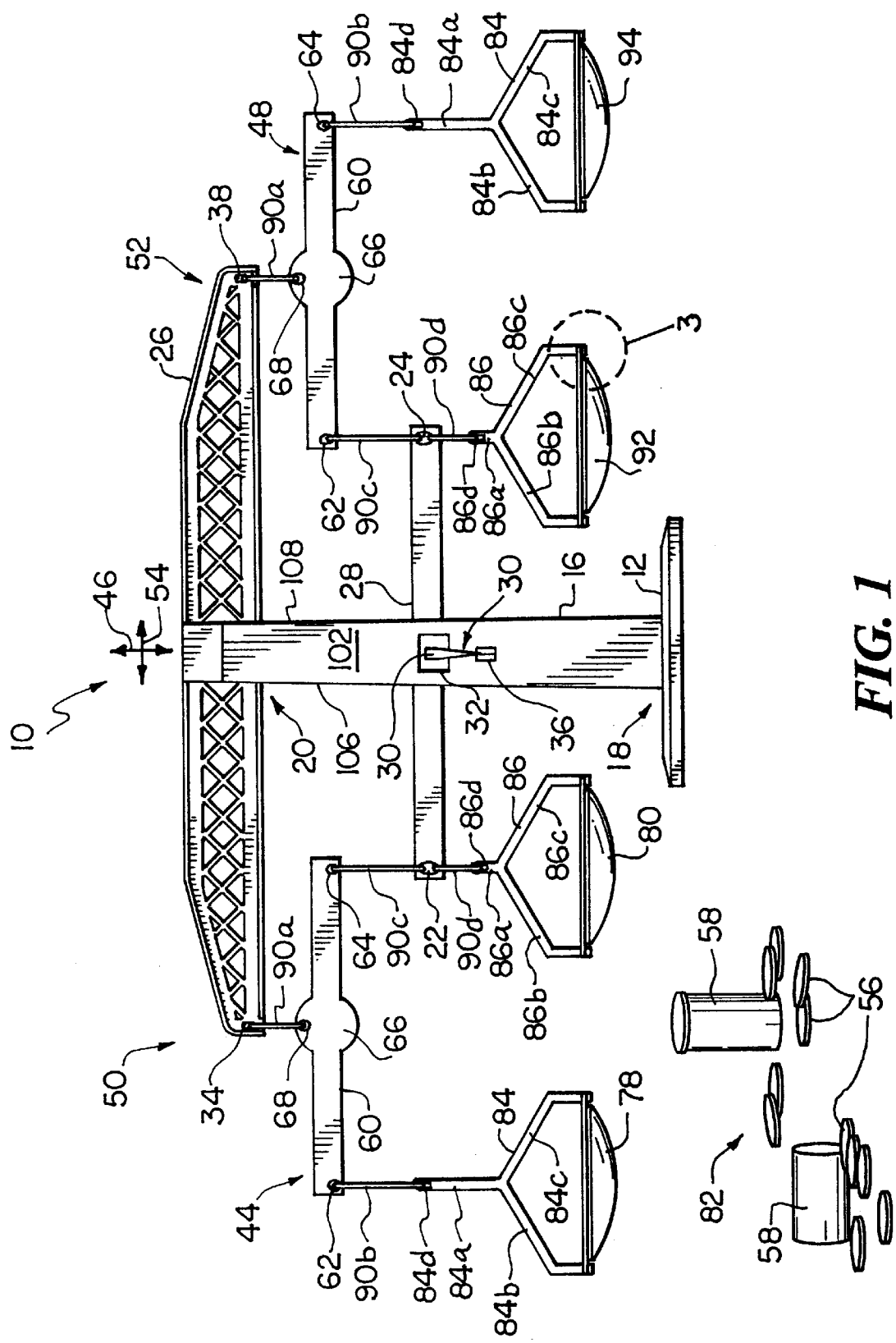
FIG. 1 is a front view of a four-pan algebra balance according to the invention.

Referring to FIG. 1, an algebra balance 10 includes a base 12, an upright stand 16 having a lower end 18 mounted to the base and extending substantially vertically, along an axis 46. A crossbar 26 is attached to an upper end 20 of the stand 16 so as to extend substantially horizontally, parallel to an axis 54. A central balance beam 28, or lever is pivotally coupled to a midpoint of the stand 16 and is adapted for being in a horizontal position, parallel to axis 54, when the balance is in equilibrium (i.e., when the demonstrated equation or expression is algebraically balanced). In accordance with a feature of the invention, an imbalance correction mechanism (FIG. 5) coupled to the balance beam and disposed within the stand 16 provides a restorative force to maintain the balance beam 28 in its horizontal position until the imbalance exceeds a predetermined level which is greater than expected tolerances in the mass of weights used with the balance.

The crossbar 26 has a first connection aperture 34 at a first end and a second connection aperture 38 at a second end. The central balance beam 28 similarly has a first connection aperture 22 at a first end and a second connection aperture 24 at a second end. The upright stand 16 has a front face, or plate 102, a back face, or plate 104 (FIG. 2) and sides 106, 108 attached to form a stand enclosure. In the illustrative embodiment, the sides 106 and 108 are integrally formed with the front plate 102 of the stand. However, it will be appreciated by those of ordinary skill in the art that various arrangements for providing the stand enclosure are possible.

In assembly, the stand 16 is attached to the base 12 by inserting the lower end 18 of the stand into a complementary shaped recess (not shown) in the base 12. The lower end 18 of the stand 16 includes at least one cantilevered tab (labeled 121 in FIG. 4) for removably engaging at least one complementary detent in the base 12. With this arrangement, the stand 16 is removably attached to the base.

The balance 10 further includes two weight receptacle subassemblies 44, 48, each including two weight receptacles, or pans 78, 80 and 92, 94, respectively, adapted to hold weights 82 in use. A first one of the subassemblies 44 is disposed on a first side 50 of the balance 10 and a second one of the subassemblies 48 is disposed on a second side 52 of the balance, with the two sides 50, 52 separated by the stand 16. The first side 50 of the balance is referred to herein alternatively as the left side and the second side 52 of the balance is referred to herein alternatively as the right side. Since each of the subassemblies 44, 48 is identical, the components comprising the subassemblies are labeled with like reference numbers, with the exception of the pans, which are uniquely labeled to facilitate discussion of the operation of the balance.

Each of the subassemblies 44, 48 includes a subassembly balance beam 60 having a first connection aperture 62 at first end, a second connection aperture 64 at a second end, a second end and a central connection portion 66 including a third connection aperture 68 centered between the first and second ends of the balance beam 28. Notably, the connection aperture 68 of the balance beams 60, which defines the fulcrum about which the beam 60 pivots, is disposed adjacent to the top edge of the connection portion 66. This arrangement is particularly advantageous since the weight of the balance beam below the fulcrum tends to urge the balance beam 60 toward its horizontal, equilibrium position.

Each subassembly 44, 48 further includes a pair of hangers 84, 86 and a plurality of clips 90a, 90b, 90c and 90d. The hangers 84, 86 include a central portion 84a, 86a from which a respective pair of legs 84b, 84c and 86b, 86c extends to engage the respective pan 78, 80, 92 and 94. In the illustrative embodiment, the hangers 84, 86 are substantially identical in construction, with the exception that the central portion 84a of the hanger 84 is somewhat longer than the central portion 86a of hanger 86.

Figure 2:
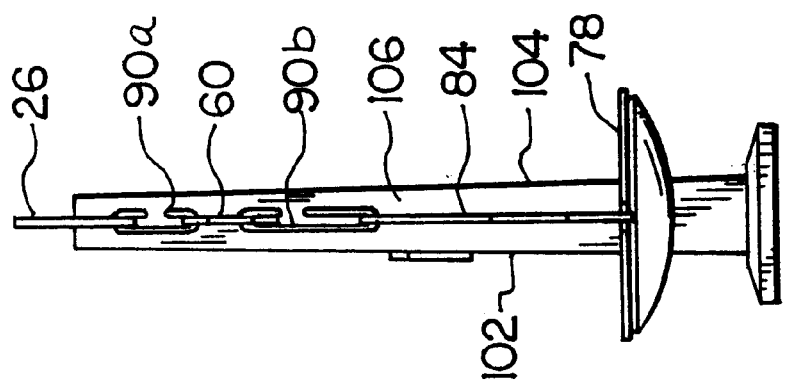
FIG. 2 is a side view of the balance of FIG. 1.

Referring to the side view of FIG. 2, the clips (only two of which 90a and 90b are shown) have hook-like ends adapted to be inserted into the connection apertures of the coupled components. Each of the clips 90a–90d is substantially identical in construction, with the exception that some are longer than others. In the illustrative embodiment, clips 90a and 90d are of equal length and clips 90b and 90c are of equal length, which length is somewhat longer than that of clips 90a and 90d.

Figure 3:
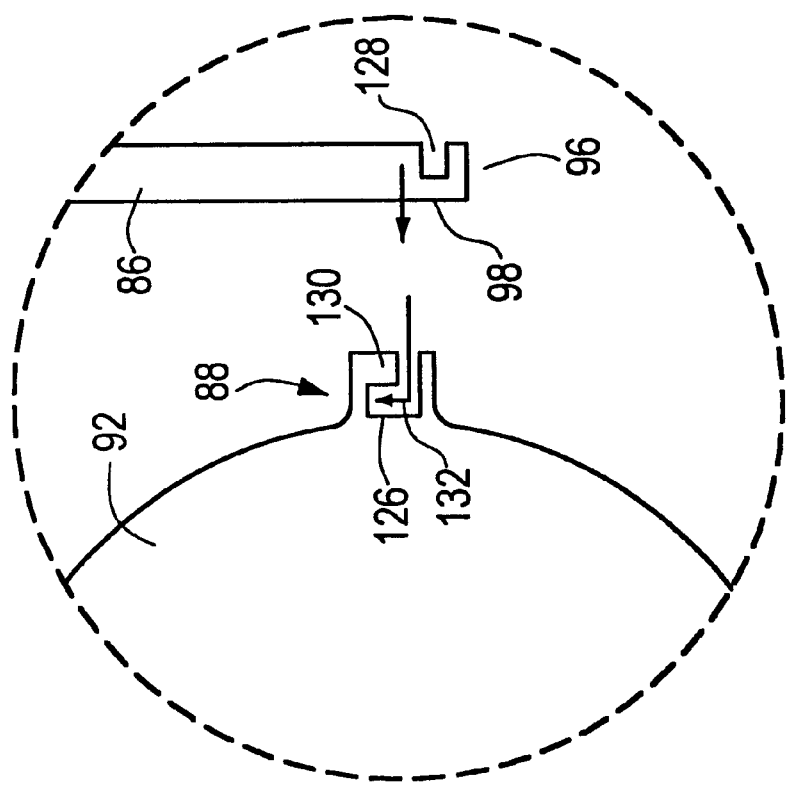
FIG. 3 is an expanded view of a hanger and a pan of the balance of FIG. 1 illustrating the interconnection thereof.

Referring to FIG. 3, the pans 78, 80, 92 and 94 are attached to the respective hanger 84, 86 with a snap-fit arrangement. Note that the pan 92 is illustrated at a ninety-degree angle relative to its horizontal assembly position. As illustrated by exemplary pan 92, each pan has a hook protrusion 88 on either side thereof (only one of which is shown in the expanded view of FIG. 3). A complementary shaped hook 96 is provided at the ends of each leg 84b, 84c and 86b, 86c of the respective hangers 84, 86, as illustrated by exemplary hanger 86.

In assembly, the hook 96 of the hanger 86 is moved into the hook protrusion 88 of the pan 92 until the edge 98 of the hanger hook 96 is in abutment with the inner wall 126 of the pan hook 88. Thereafter, the hanger 86 is urged in the direction of arrow 132 and into snap-fit relationship with the pan hook 88, such that the notch 128 in the hanger hook 96 encompasses the tab 130 of the pan hook 88.

In the illustrative embodiment, the stand 16, crossbar 26 and balance beam are pre-assembled. However, features of the resulting subassembly are described in conjunction with FIGS. 4–7.

Assembly of the weight receptacle subassemblies 44, 48 will be described in conjunction with exemplary subassembly 44. The subassembly balance beam 60 is coupled to the crossbar 26 by inserting one end of the clip 90a into the crossbar aperture 34 and the other end of the clip 90a into the balance beam aperture 68. The hanger 84 (with pan 78 attached as described above) is coupled to the subassembly balance beam 60 by inserting a first end of the clip 90b into the balance beam aperture 62 and a second end of the clip 90b onto a hook 84d of the hanger 84. Further, the hanger 86 (with pan 80 attached thereto) is coupled to the central balance beam 28 by inserting a first end of the clip 90d into the connection aperture 22 of the beam and by inserting a second end of the clip 90d onto a hook 86d of the hanger 86. Finally, the central balance beam 28 is coupled to the subassembly balance beam 60 by inserting a first end of the clip 90c into the connection aperture 64 of the subassembly balance beam 60 and a second end of the clip 90c into the connection aperture 22 of the central balance beam 28.

It will be appreciated by those of ordinary skill in the art that the particular order in which the balance 10 is assembled is not critical and the connection mechanisms may be altered. For example, the clips 90a–90d may comprise a plurality of clips coupled together. Further, it will be appreciated by those of ordinary skill in the art that the particular selection of the dimensions and shapes of components of the balance can be readily varied.

A visual indicator 30 is provided in the form of a pointer coupled to the central balance beam 28. The pointer 30 extends through a window 32 in the front plate 102 of the stand 16 and is adapted for being in a first position (shown) in which the pointer extends substantially vertically along axis 46 to indicate algebraic equality when the sides 50, 52 are substantially balanced and for being in at least one second position in which the pointer 30 is tilted relative to the vertical axis 46 to indicate algebraic inequality when the sides 50, 52 are imbalanced by more than a predetermined amount. The position of the pointer 30 is readily discernible due to the use of a vertical marking 36 on the stand 16 along the axis 46. While the extent to which the indicator 30 points to the left or right of the marking 36 is a function of the extent of the imbalance, for simplicity of illustration, the indicator 30 can be considered to be in one of three positions; the first, substantially vertical position, when the sides 50 and 52 are substantially balanced, a second position pointing toward the left side 50 when the right side 52 of the balance represents a greater value than the left side 50 by more than the predetermined amount, and a third position in which the pointer points to the right side 52 when the left side 50 of the balance represents a greater value than the right side 52 by more than the predetermined amount. Stated differently, the indicator 30 points to the lighter side of the balance 10.

Various materials are suitable for fabricating the components of the balance 10. In the illustrative embodiment, substantially all of the components of the balance are plastic. The use of plastic is advantageous due to its relatively low cost and ease of manufacture by conventional techniques, such as injection molding. However, it will be appreciated by those of ordinary skill in the art that various materials, including metals or wood, fabricated by various conventional techniques are also suitable.

The balance 10 is intended for use with weights 82, some of which are of "known" mass and some of which are of "unknown," but marked, mass. In the illustrative embodiment, the weights of known mass include individual, disk-shaped weights, or chips 56 and covered canisters 58. Each of the chips 56 and covered canisters 58 (when empty) are of equal nominal mass. In the illustrative embodiment, each chip 56 and covered canister 58 has a nominal mass of 7.0 grams and, in use, corresponds to an integer value of one. The weights of unknown mass are implemented by covered canisters 58, which can either be empty or can contain one or more chips 56. These weights are "unknown" in the sense that one partner of the team using the balance does not know the variable represented by the covered canister. This partner manipulates chips 56 and or canisters 58 in order to demonstrate algebraic principles and/or to solve equations, as will be described. As will become apparent, the partner who solves the equation has available additional chips 56 and canisters 58 filled with the same number of chips as the canister(s) used to model the equation.

The weights 82 may be comprised of various materials capable of being manufactured in a relatively repeatable and consistent manner, thereby providing the chips 56 and covered, empty canisters 58 with substantially equal mass. As one example, the chips 56 and the covered canisters 58 are comprised of plastic manufactured by injection molding. As another example, the covered canisters 58 may be comprised of plastic and the chips 56 comprised of metal. However, some tolerance in the mass of the weights is typical and generally unavoidable without incurring the significant expense associated with precision manufacturing techniques and tight quality control. A typical tolerance of the mass of the chips 56 and covered canisters 58 is on the order of one-quarter of the mass of a chip 56, or 1.75 grams. In order to prevent false indications of inequality when an imbalance is attributable to typical, expected weight tolerances, the balance 10 of the subject invention implements an imbalance correction mechanism 100 (FIG. 5).

Referring to FIG. 4, a view of the back plate 104 of the stand 16 from "inside" the stand enclosure is shown. FIG. 4A is a side view of the back plate 104 of FIG. 4. The back plate 104 includes a pin 118 protruding from a lower portion thereof and a plurality of stand-offs 122 protruding from a central portion thereof. In assembly, the stand-offs 122 maintain the plane of the central balance beam 28 in a substantially vertical position and the imbalance correction mechanism 100 (FIG. 5) is coupled to the pin 118. The back plate 104 further includes a cantilevered tab 121 for removably engaging a complementary detent of the base 12 in assembly.

FIG. 5 illustrates the back plate 104 in relation to the central balance beam 28 in assembly. The central balance beam 28 includes a central connection portion 110 having a fulcrum aperture 112 at which the beam is pivotally coupled to the stand. The balance beam 28 further includes a hook 116 for coupling to the imbalance correction mechanism 100 and the indicator 30, only a portion of which is shown in order to avoid obscuring the hook 116.

In the embodiment of FIG. 5, the imbalance correction mechanism 100 is provided in the form of a elastic band 120 coupled between the hook 116 of the central balance beam 28 and the pin 118 extending from the back plate 104 of the stand 16. The band 120 is pulled taught (i.e., is biased in tension) so that, in response to a force on one or both of the connection apertures 22, 24 of the beam 28 tending to cause the beam to pivot about the fulcrum dowel 114, the band 120 provides a restorative force to urge the beam toward its horizontal, equilibrium position. It will be appreciated by those of ordinary skill in the art, that various forms of the imbalance correction mechanism are possible, including a strip of elastic material, a spring, or a combination thereof.

Figures 6, 6A:
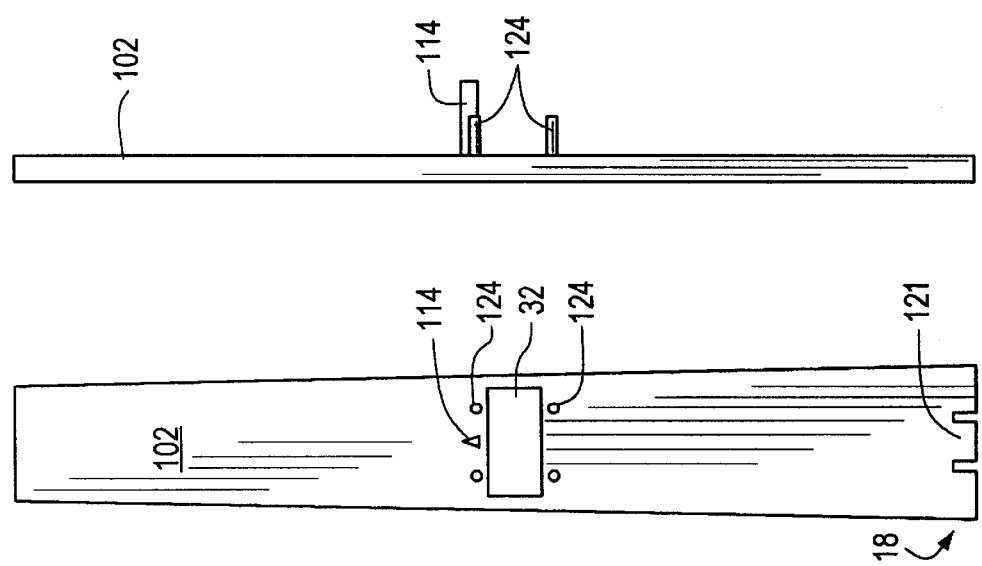
FIG. 6 shows the front plate of the stand of FIG. 1.
FIG. 6A is a side view of the front plate of FIG. 6.

Referring also to FIG. 6, a view of the front plate 102 of the stand 16 from "inside" the stand enclosure is shown. FIG. 6A is a side view of the front plate 102 of FIG. 6. The front plate 102 includes a fulcrum dowel 114 protruding from the plate 102, stand-offs 124 protruding from the plate 102 and the window 32 through which the indicator 30 extends in assembly. The front plate 102 further includes a cantilevered tab 121 for engaging a complementary detent of the base in assembly.

In assembly, the balance beam 28 is attached to the stand 16 by placing the fulcrum dowel 114 on the front plate 102 of the stand through the fulcrum aperture 112 and attaching the band 120 to the hook 116 of the balance beam 28 and to the pin 118 on the back plate 104 of the stand. Thereafter, the front plate 102, the back plate 104 and sides 106, 108 are sealed to form the stand enclosure, such as with epoxy. The stand-offs 122 and 124 abut the connection portion 110 of the balance beam 28 and function to maintain the plane of the balance beam 28 in a substantially vertical position.

The fulcrum aperture 112 of the balance beam 28 is advantageously positioned adjacent to the top edge of the connection portion 110. As in the case of the connection apertures 68 of the subassembly balance beam 60, the high fulcrum aperture 112 serves to urge the balance beam 28 to its horizontal, equilibrium position. This is because substantially all of the weight of the beam 28 is disposed below the fulcrum 112, thereby providing a restorative force to center the beam 28. In this way, the high fulcrum aperture 112 works with the imbalance correction mechanism 100 to maintain the beam 28 in its horizontal position until the imbalance exceeds a predetermined amount. The combination of the restorative forces presented by the relatively high fulcrum 112 and the band 120 are selected to offset typical expected tolerances of the weights 82. In the illustrative embodiment, the combined restorative force is selected to maintain the balance beam 28 in its horizontal equilibrium position until the imbalance between the sides 50, 52 of the device exceeds the expected maximum tolerance in the mass of the weights, such as 1.75 grams.

Figure 7:
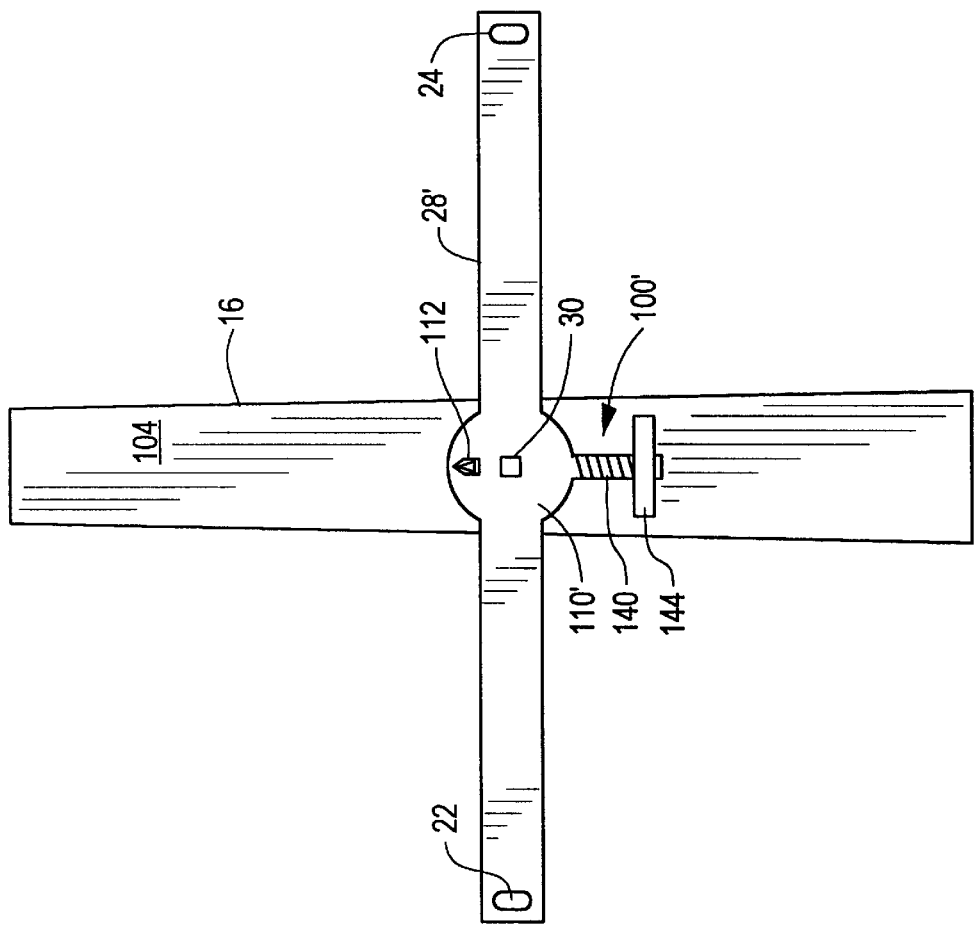
FIG. 7 shows the relative placement of the back plate of the stand of FIG. 1 and alternate embodiments of the central balance beam and imbalance correction mechanism.

Referring to FIG. 7, an alternate embodiment of the imbalance correction mechanism 100' and balance beam 28' includes a threaded bolt 140 adapted to receive a threaded nut 144. The bolt 140 is attached to a lower region of the central connection portion 110' of the balance beam 28' and functions in the manner of a weight. More particularly, the weight of the bolt 140 provides a restorative force which urges the central balance beam 28 toward its horizontal position.

The extent to which the nut 144 is screwed onto the bolt 140 dictates the moment arm of the weight and, thus, the extent of the restorative force. That is, when greater restorative force is desired, the nut 144 is screwed onto the bolt 140 to a lesser extent; whereas, when a lesser restorative force is desired, the nut 144 is screwed onto the bolt 140 to a greater extent.

Figure 8:
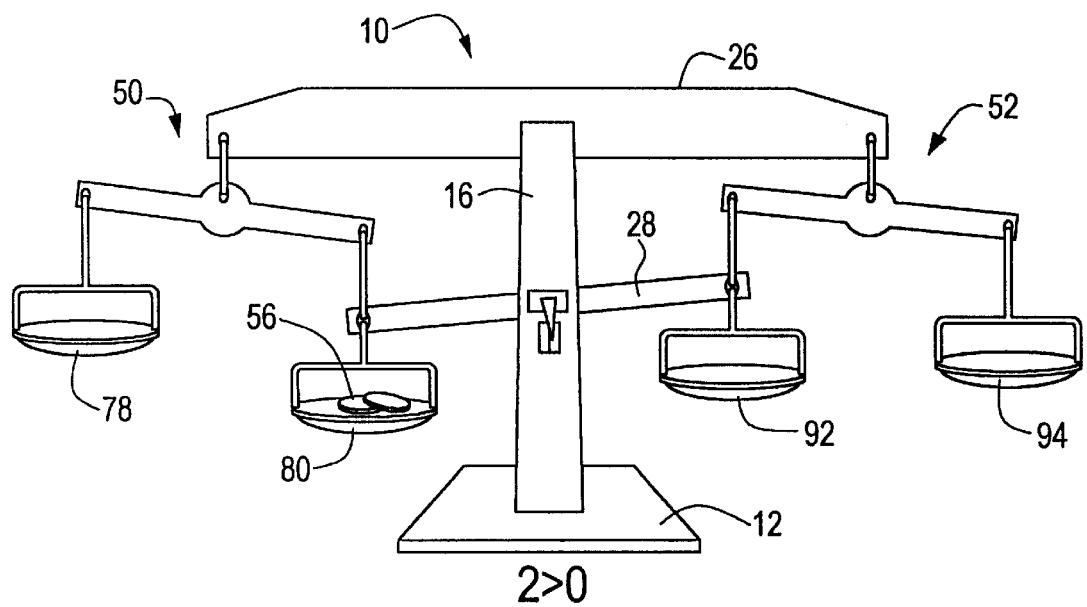
FIG. 8 illustrates the operation of the balance of FIG. 1.
Figure 9:
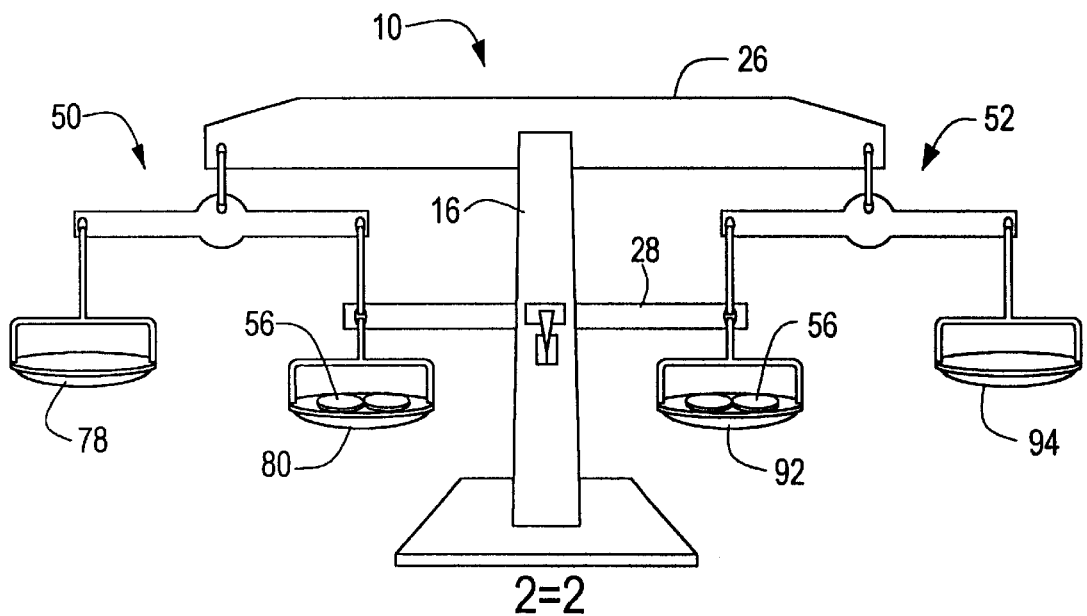
FIG. 9 further illustrates the operation of the balance of FIG. 1.

The operation of the algebra balance is illustrated in conjunction with FIGS. 8–19. The two "inner" pans 80 and 92 of the balance 10 operate in the manner of a conventional "swing balance". That is, putting weights 82 in one of the inner pans 80, 92 causes the respective side 50, 52 of the balance to be heavier than the other side and thus, causes the balance beam 28 to tilt accordingly. This operation is illustrated in FIG. 8, in which chips 56 are disposed only in the left inner pan 80. In this case, the left side 50 of the balance is heavier than the right side 52, causing the balance beam 28 to tilt down toward the left and the indicator to point toward the right, lighter side 52, as shown. Thus, one way to move the balance 10 into equilibrium is to put the same number of weights 82 in both of the inner pans 80 and 92, as shown in FIG. 9.

Figure 10:
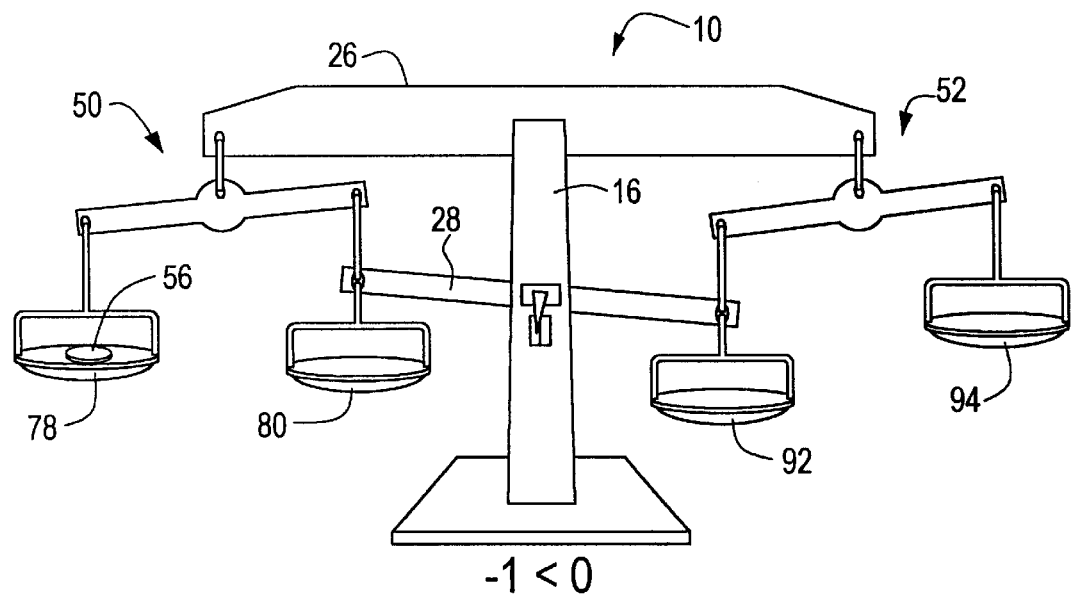
FIG. 10 illustrates the operation of the balance of FIG. 1.
Figure 11:
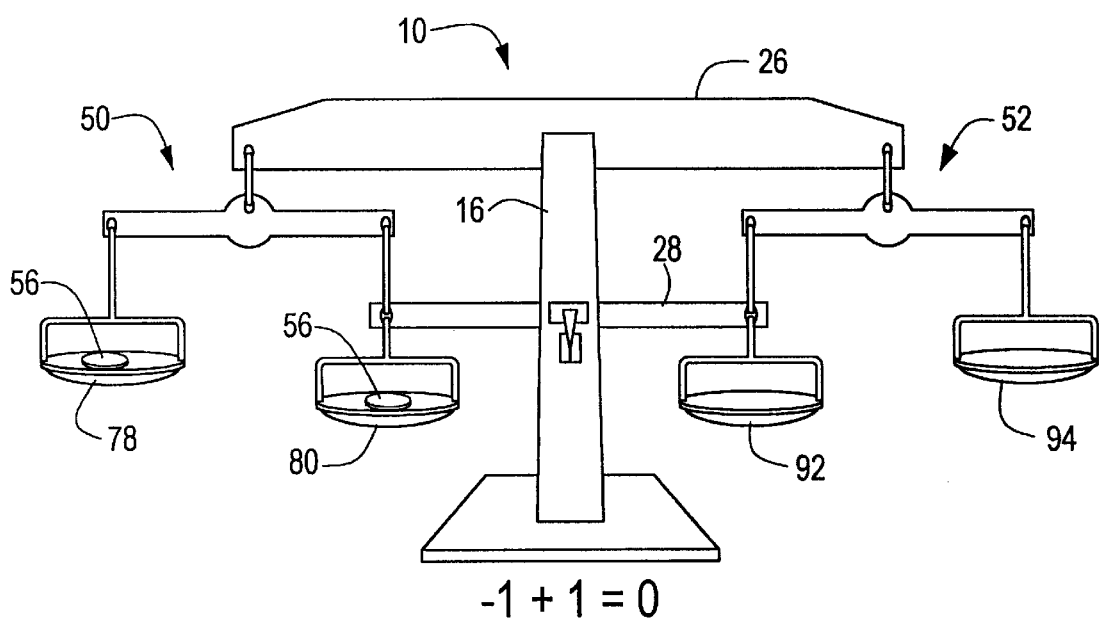
FIG. 11 further illustrates the operation of the balance of FIG. 1.
Figure 12:
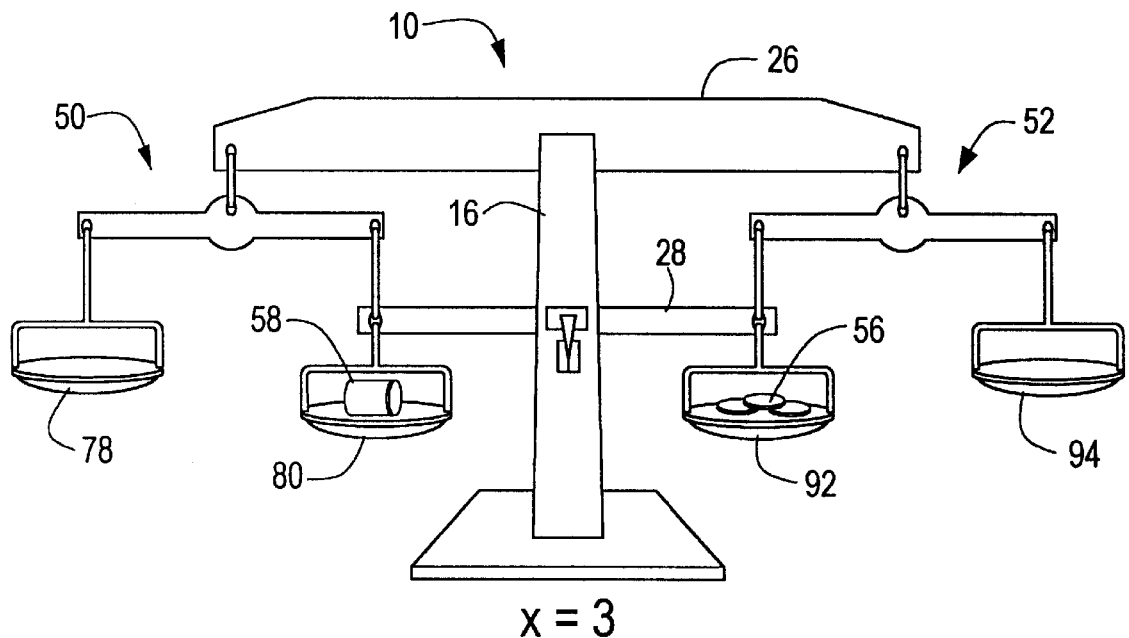
FIG. 12 illustrates use of the balance of FIG. 1 in modeling an equality.

Weights 82 placed into either of the outer pans 78 and 94 represent negative numbers, whereas weights placed in the inner pans 80 and 92 represent positive numbers. FIG. 10 illustrates this principal, in which only the left outer pan 78 contains a chip 56. This arrangement causes the left inner pan 80 to move upward, indicating that it is lighter than the right inner pan 92, as is further indicated by the pointer 30 pointing toward the left side 50. Since the right side 52 of the balance is heavier than the left side 50 and since the right pans 92 and 94 are empty, representing a value of zero, the left side 50 of the balance has a negative value. The balance can be returned to equilibrium by balancing the negative value represented by the chip 56 in the left outer pan 78 with an equal positive value in the adjacent left inner pan 80, as illustrated in FIG. 11.

The balance 10 can be used to demonstrate equivalent equalities. Consider, for example the simple equality modeled in FIG. 12. Since the inner right pan 92 contains three chips 56 and since the balance is in equilibrium, the covered canister 58 in the left inner pan 80 contains two chips 56 which, in combination with the weight of the covered canister represent a value of three. Thus, the modeled equality is given by x=3.

Figure 13:
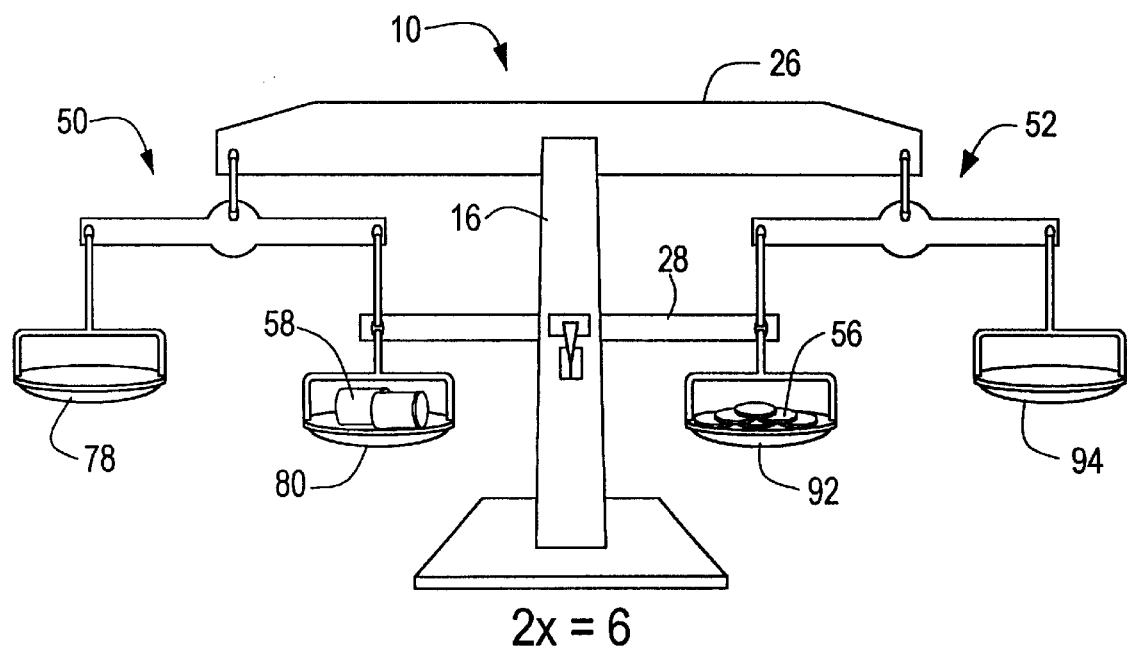
FIG. 13 illustrates use of the balance of FIG. 1 in demonstrating the multiplication principle of equality.

Referring to FIG. 13, the multiplication principle of equality is used to model a first equivalent equality. This is achieved by doubling the amount of the weight in each pan. More particularly, a second covered canister 58 containing two chips 56 is placed in the left inner pan 80 and an additional three chips 56 are placed in the right inner pan 92, as shown. This arrangement has the affect of multiplying each side of the equality by a factor of two and thus represents the equivalent equality 2x=6.

Figure 14:
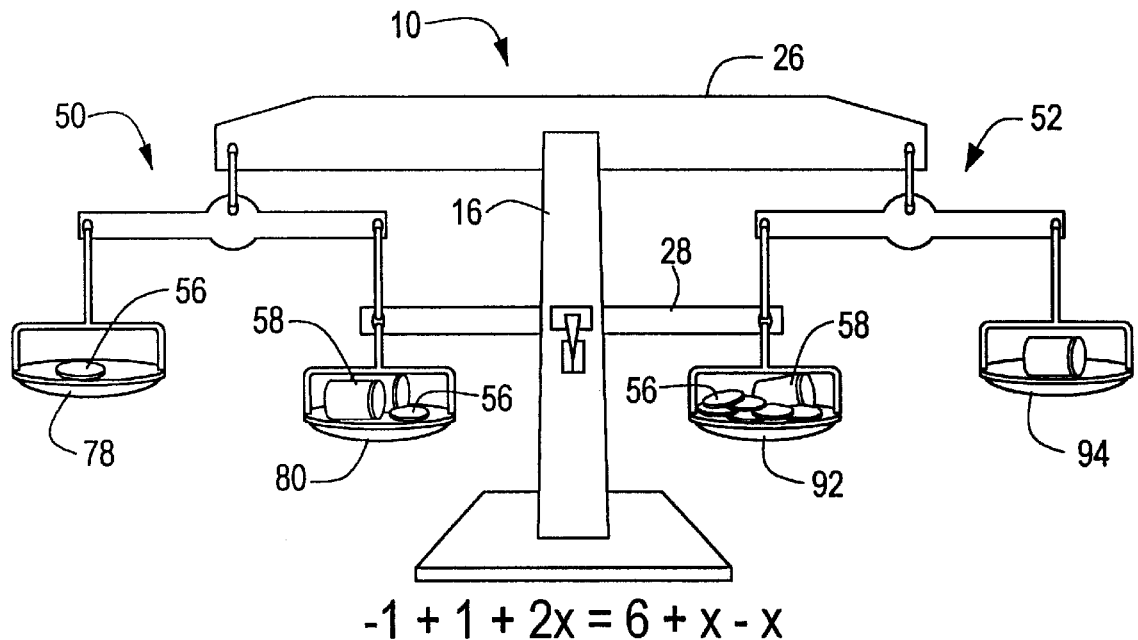
FIG. 14 illustrates use of the balance of FIG. 1 in demonstrating the zero principle of equality.

A zero principle of equality is illustrated by the modification shown in FIG. 14, in which the same weight, specifically one chip 56, is added to each left pan 78 and 80 and the same weight, specifically one canister, is added to reach right pan 92 and 94. This arrangement illustrates the further equivalent equality of −1+1+2x=6+x−x.

Figure 15:
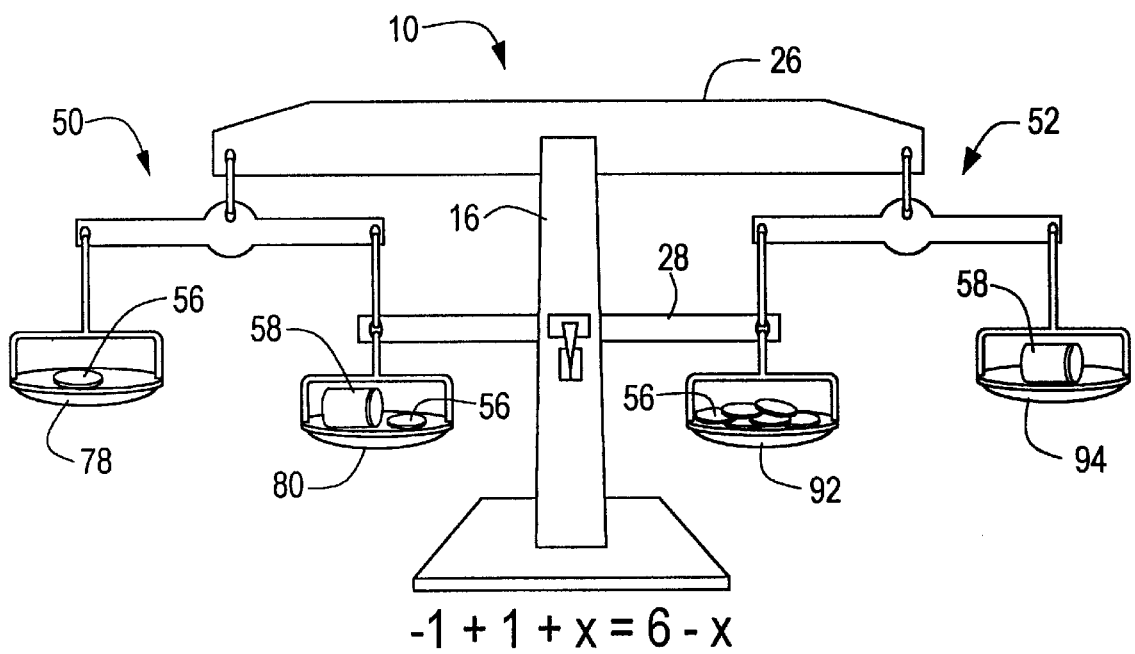
FIG. 15 illustrates use of the balance of FIG. 1 in demonstrating the subtraction principle of equality.
Figure 16:
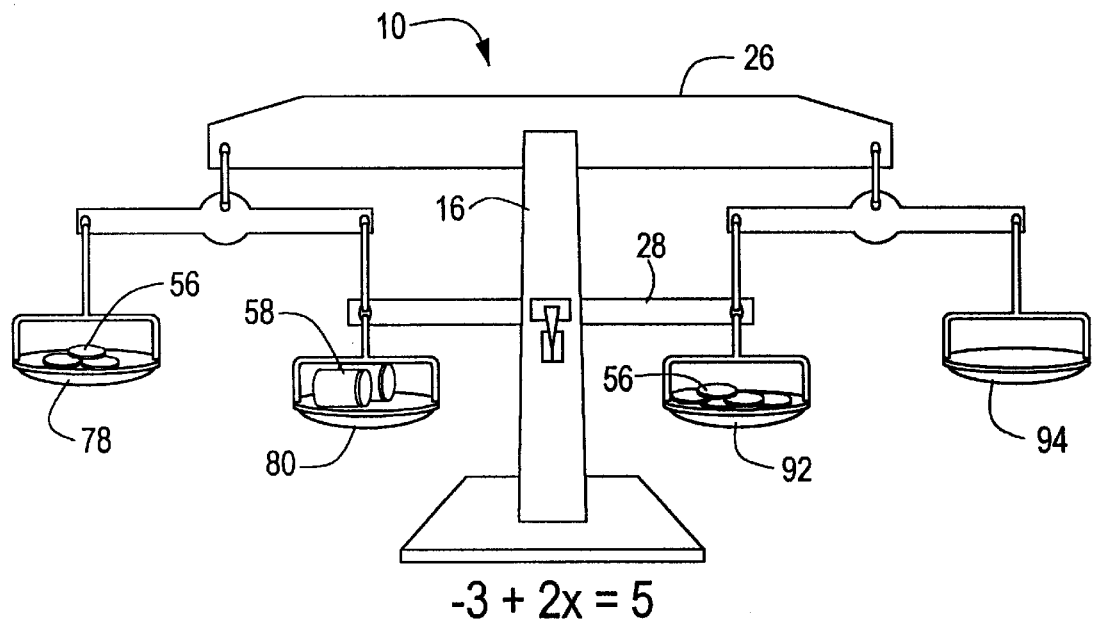
FIG. 16 illustrates use of the balance of FIG. 1 in modeling a linear equation.

Referring to FIG. 15, the subtraction principle of equality is illustrated, in which the same number is subtracted from both sides of an equality. In the illustrative example, this operation is achieved by removing one covered canister 58 from the left inner pan 80 and one covered canister 58 from the right inner pan 92. This further equivalent equality is given by −1+1+x=6−x.

FIGS. 16 through 19 illustrate use of the balance 10 in modeling and solving a linear equation. In general, this technique includes the use of one or more of the zero principle of equality, the addition and subtraction principles of equality and the multiplication principle of equality, as illustrated above. One partner selects an equation whose solution is known and fills the canisters 58 accordingly, without the other partner's knowledge. The other partner who must solve the equation, is instructed to manipulate canisters 58 and chips 56 so as to get all of the canisters 58 on one side of the balance 10 and all of the chips 56 on the other side while keeping the balance in equilibrium. More particularly, this other partner who solves the equation has available additional chips 56 and canisters 58 filled with the same number of chips as the canister(s) used to model the equation. Typically, the partner who models the equation to be solved does so as the result of manipulations of equivalent equalities, such as shown in FIGS. 12–15.

Figure 17:
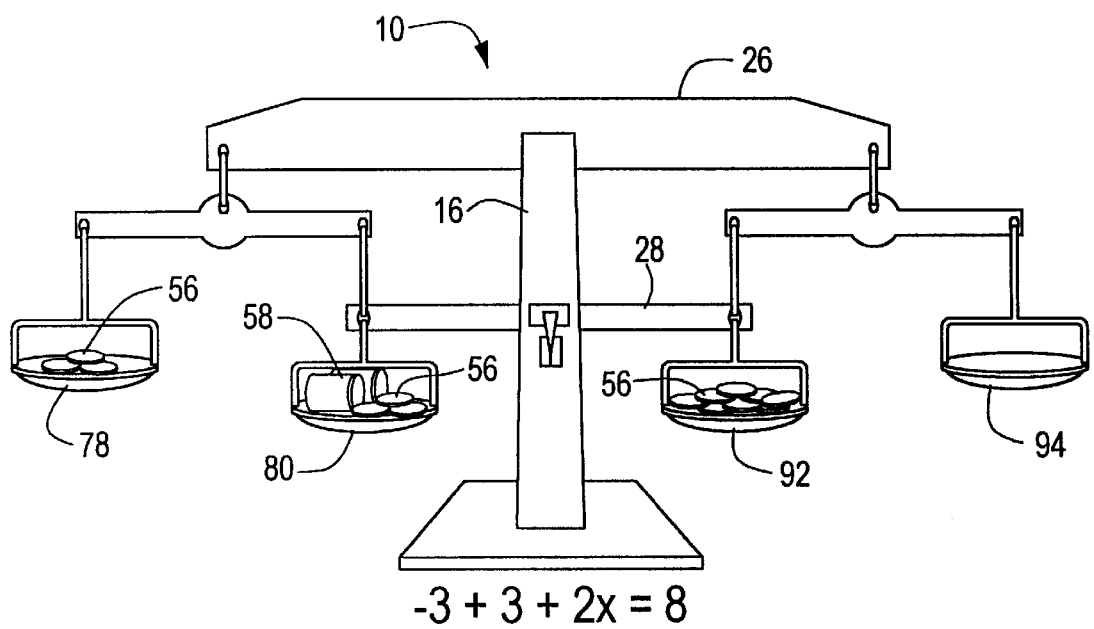
FIG. 17 illustrates a step toward solving the equation modeled in FIG. 16.
Figure 18:
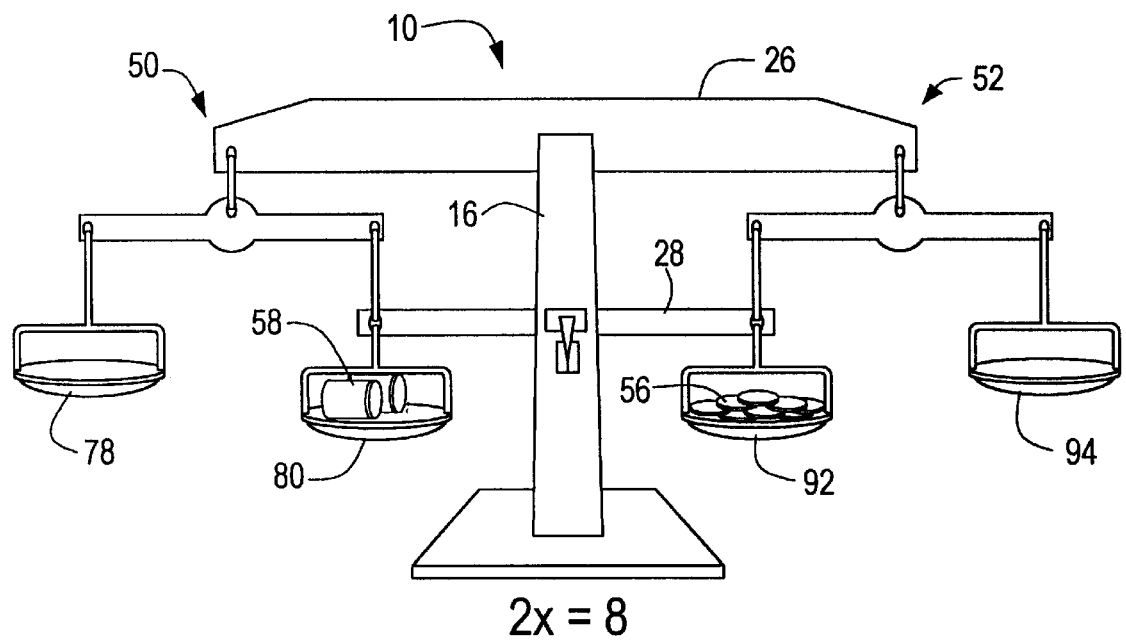
FIG. 18 illustrates a further step toward solving the equation of FIG. 16.
Figure 19:
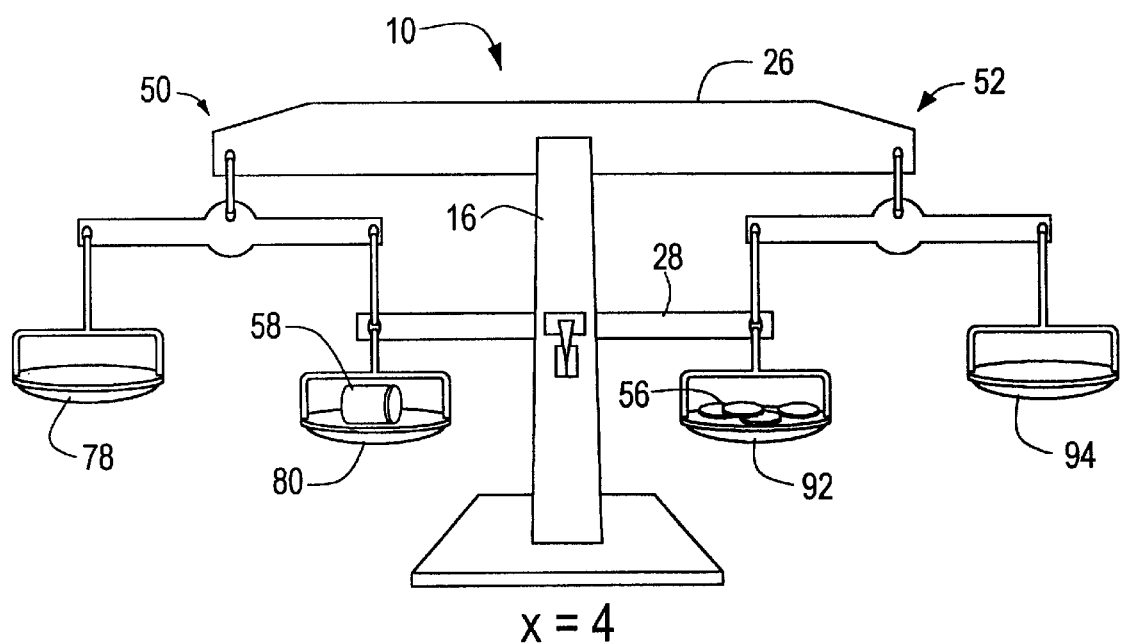
FIG. 19 illustrates a final step in solving the equation of FIG. 16.

By way of an example, consider the case where the modeled linear equation is given by: −3+2x=5. This equation is modeled in FIG. 16, in which the two canisters 58 in the left inner pan 80 contain three chips 56. A first step toward solving the equation utilizes the addition principle of equality as shown in FIG. 17, in which three chips 56 are added to each inner pan 80 and 92, thereby representing the equality: −3+3+2x=8. Thereafter, the zero principle of equality is used as three chips 56 are removed from each of the left side pans 78 and 80 to provide the arrangement shown in FIG. 18 which represents the equivalent equality of 2x=8.

Finally, the multiplication principle of equality is used to solve the equation. More particularly, both sides of the equation are divided by a factor of two, by removing one canister 58 from the left inner pan 80 and four of the eight chips 56 from the right inner pan 92, as shown. The result of FIG. 19 demonstrates that the variable, x, is equal to the value 4.

It will be appreciated by those of ordinary skill in the art that the operation of the balance 10 shown in FIGS. 8–19 is illustrative only of the algebraic principles and uses to which the balance can be put. These examples are not exhaustive and others will be ascertainable by those of ordinary skill in the art. These include, but are not limited to, modeling an identity and multiplying an inequality by a value of −1. The latter operation is achieved by modeling an inequality and swapping the contents of the two left pans 78 and 80 and swapping the contents of the two right pans 92 and 94.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An algebra balance comprising:
    a base;
    an upright stand mounted to the base so as to extend substantially vertically;
    a crossbar mounted to an upper end the stand so as to extend substantially horizontally;
    a balance beam pivotally coupled to a midpoint of the stand and having a horizontal position in equilibrium;
    a first weight receptacle subassembly comprising a first pair of pans and being coupled to a first end of the crossbar and a first end of the balance beam;
    a second weight receptacle subassembly comprising a second pair of pans and being coupled to a second end of the crossbar and a second end of the balance beam; and
    an imbalance correction mechanism coupled to the balance beam for maintaining the balance beam in the horizontal position unless the imbalance between the first and second weight receptacle subassemblies exceeds a predetermined amount.

2. The balance of claim 1 further comprising a visual indicator coupled to the balance beam for providing an indication of the balance between the first and second weight receptacle subassemblies, the indicator adapted for being in first position when the first and second weight receptacle subassemblies are substantially balanced and for being in a second position when the first and second weight receptacle subassemblies are imbalanced by more than the predetermined amount.

3. The balance of claim 2 wherein the visual indicator includes a pointer coupled to the balance beam and movable within a window of the stand and wherein the first position of the indicator is substantially centered within the window.

4. The balance of claim 3 wherein the visual indicator is adapted for being in the second position when the first weight receptacle subassembly represents a greater value than the second weight receptacle subassembly by more than the predetermined amount and for being in a third position when the second weight receptacle subassembly represents a greater value than the first weight receptacle subassembly by more than the predetermined amount, and wherein the second position is adjacent to a first side of the window and the third position is adjacent to a second side of the window.

5. The balance of claim 1 wherein the imbalance correction mechanism is coupled between the balance beam and the stand.

6. The balance of claim 5 wherein the imbalance correction mechanism is one of an elastic strip, an elastic band and a spring.

7. The balance of claim 1 wherein the imbalance correction mechanism comprises a bolt adapted to mate with a nut.

8. The balance of claim 7 wherein the predetermined amount of imbalance is adjustable by adjusting the extent to which the nut is mated with the bolt.

9. The balance of claim 1 wherein the predetermined amount of imbalance is a function of expected manufacturing tolerances in the mass of weights for use with the balance.

10. The balance of claim 1 wherein the balance beam includes a connection mechanism for pivotally coupling to the midpoint of the stand, the connection mechanism being substantially centered between the first and second ends of the balance beam and being adjacent to a top edge of the balance bean.

11. The balance of claim 1 wherein the balance is adapted for use with weights comprising:
    a plurality of chips, each having a predetermined mass; and
    a plurality of covered canisters, each having the predetermined mass when empty and being adapted to receive one or more of the chips.

12. A method of providing an algebra balance, comprising the steps of:
    providing a base, an upright stand mounted to the base and extending substantially vertically and a crossbar mounted to an upper end of the stand so as to extend substantially horizontally;
    attaching a balance beam to a midpoint of the stand about which the balance beam is pivotable, the balance beam being disposed in a horizontal position in equilibrium;
    attaching a first weight receptacle subassembly comprising a first pair of pans to a first end of the crossbar and a first end of the balance beam;

attaching a second weight receptacle subassembly comprising a second pair of pans to a second end of the crossbar and a second end of the balance beam; and providing a restorative force to the balance beam to maintain the balance beam in the horizontal position unless the first and second weight receptacle subassemblies are imbalanced by more than a predetermined amount.

13. The method of claim 12 further comprising the step of visually indicating algebraic equality when the first and second weight receptacle subassemblies are substantially balanced and visually indicating inequality when the first and second weight receptacle subassemblies are imbalanced by more than the predetermined amount.

14. The method of claim 12 wherein the restorative force providing step includes coupling an imbalance correction mechanism to the balance beam.

15. The method of claim 14 further including the step of coupling the imbalance correction mechanism between the balance beam and the stand.

16. The method of claim 15 further including the step of providing the imbalance correction mechanism as one of an elastic strip, an elastic band and a spring.

17. The method of claim 14 further comprising the step of providing the imbalance correction mechanism as a bolt adapted to mate with a nut.

18. The method of claim 17 further including the step of adjusting the restorative force by varying the extent to which the nut is mated with the bolt.

19. The method of claim 13 wherein the visually indicating step includes providing a pointer coupled to the balance beam and movable within a window of the stand, wherein the pointer is substantially centered within the window when the first and second weight receptacle subassemblies are substantially balanced and is disposed adjacent to a side of the window when the first and second weight receptacle subassemblies are imbalanced by more than the predetermined amount.

20. The method of claim 12 wherein the balance beam attaching step includes attaching a connection mechanism of the balance beam to the midpoint of the stand, with the connection mechanism being substantially centered between the first and second ends of the balance beam and being disposed adjacent to a top edge of the balance beam.

21. The method of claim 12 further comprising the steps of providing a plurality of chip weights, each having a predetermined mass and providing a plurality of covered canisters, each adapted for receiving one or more of the chip weights and having the predetermined mass when empty.

* * * * *